United States Patent
Ohwatari et al.

(10) Patent No.: US 9,066,358 B2
(45) Date of Patent: Jun. 23, 2015

(54) MOBILE COMMUNICATION TERMINAL

(75) Inventors: Yusuke Ohwatari, Chiyoda-ku (JP);
Nobuhiko Miki, Chiyoda-ku (JP);
Takahiro Asai, Chiyoda-ku (JP);
Yukihiko Okumura, Chiyoda-ku (JP)

(73) Assignee: NTT DOCOMO, INC., Tokyo (JP)

(*) Notice: Subject to any disclaimer, the term of this patent is extended or adjusted under 35 U.S.C. 154(b) by 160 days.

(21) Appl. No.: 13/818,865

(22) PCT Filed: Apr. 19, 2012

(86) PCT No.: PCT/JP2012/060596
§ 371 (c)(1),
(2), (4) Date: Feb. 25, 2013

(87) PCT Pub. No.: WO2012/147617
PCT Pub. Date: Nov. 1, 2012

(65) Prior Publication Data
US 2013/0148538 A1    Jun. 13, 2013

(30) Foreign Application Priority Data
Apr. 25, 2011    (JP) .................................. 2011-096979

(51) Int. Cl.
*H04W 4/00*    (2009.01)
*H04L 1/00*    (2006.01)
(Continued)

(52) U.S. Cl.
CPC .......... *H04W 72/082* (2013.01); *H04B 7/0865* (2013.01); *H04L 5/0023* (2013.01); *H04L 5/0048* (2013.01); *H04W 88/02* (2013.01); *H04L 5/0016* (2013.01); *H04L 5/0051* (2013.01); *H04L 5/0091* (2013.01); *H04L 25/03866* (2013.01); *H04L 25/03891* (2013.01);
(Continued)

(58) Field of Classification Search
USPC .......... 370/252, 328–329; 375/148, 227, 260; 455/63.1, 101, 450, 562.1
See application file for complete search history.

(56) References Cited

U.S. PATENT DOCUMENTS

2010/0285810 A1* 11/2010 Ko et al. ................... 455/450
2012/0099544 A1* 4/2012 Pajukoski et al. ......... 370/329
2012/0201187 A1* 8/2012 Koo et al. ................. 370/312

FOREIGN PATENT DOCUMENTS

JP    2000 511370    8/2000
WO    WO 99/31820 A1    6/1999

OTHER PUBLICATIONS

3GPP TSG RAN WG1 Meeting #64 R1-111031, "On advanced UE MMSE receiver modelling in system simulations," Nokia, Nokia Seimens Networks, Total 10 Pages, (Feb. 21-25, 2011).

(Continued)

*Primary Examiner* — Kiet G Tang
(74) *Attorney, Agent, or Firm* — Oblon, McClelland, Maier & Neustadt, L.L.P.

(57) ABSTRACT

A mobile communication terminal including multiple receiving antennas demodulates an interfering UE-specific reference signal that might be used in another mobile communication terminal, and analyzes interference parameters specified by the interfering UE-specific reference signal demodulated by the interfering UE-specific reference signal demodulator, the interference parameters being parameters with regard to another beam sent to another mobile communication terminal from an interfering base station. Then, the mobile communication terminal calculates receiving weights so as to suppress influence to the desired beam from other beams, on the basis of desired beam parameters and the interference parameters.

10 Claims, 6 Drawing Sheets

(51) Int. Cl.
*H04H 20/71* (2008.01)
*H04W 72/00* (2009.01)
*H04W 72/08* (2009.01)
*H04B 7/08* (2006.01)
*H04J 11/00* (2006.01)
*H04B 7/02* (2006.01)
*H04B 7/04* (2006.01)
*H04L 5/00* (2006.01)
*H04W 88/02* (2009.01)
*H04L 25/03* (2006.01)
*H04B 7/06* (2006.01)

(52) U.S. Cl.
CPC ............ *H04L 5/0035* (2013.01); *H04J 11/005* (2013.01); *H04B 7/0691* (2013.01); *H04B 7/024* (2013.01); *H04B 7/0452* (2013.01)

(56) References Cited

OTHER PUBLICATIONS

Thiele, L., et al., "On the Value of Synchronous Downlink MIMO-OFDMA Systems with Linear Equalizers," IEEE ISWCS, pp. 428-432, (2008).
3GPP TS 36.211 V10.0.0, "3rd Generation Partnership Project; Technical Specification Group Radio Access Network; Evolved Universal Terrestrial Radio Access (E-UTRA); Physical channels and modulation," pp. 1-103, (Dec. 2010).
International Search Report Issued Jul. 24, 2012 in PCT/JP12/60596 Filed Apr. 19, 2012.
Extended European Search Report issued Sep. 18, 2014, in European Patent Application No. 12777046.9.
Office Action issued Dec. 12, 2014 in Chinese Patent Application No. 201280003211.X (with English translation).

\* cited by examiner

MOBILE COMMUNICATION TERMINAL

FIELD OF THE INVENTION

The present invention relates to a mobile communication terminal.

BACKGROUND ART

In LTE (Long Term Evolution) Advanced of 3GPP (Third Generation Partnership Project), OFDMA (Orthogonal Frequency Division Multiplexing Access) using MU-MIMO (multi-user multiple-input multiple-output) has been proposed. In MU-MIMO downlink transmission, a base station is able to not only communicate with multiple mobile communication terminals, but also to transmit different data streams (layers) simultaneously to a mobile communication terminal.

In addition, in LTE Advanced, a reception technique for mobile communication terminals called as interference rejection combining has been discussed. Interference rejection combining (IRC) is a technique for downlink communication, in which a mobile communication terminal gives weights to signals obtained by reception antennas so as to suppress interference to the desired electric wave beam from the visited base station (desired base station) caused by interfering electric wave beams from interfering base stations at the mobile communication terminal. IRC improves the reception quality of desired signals on a desired electric wave beam especially in a case in which a mobile communication terminal 10 is located near the boundary of a visited cell 1a (cell of the desired base station 1) and receives strong interfering electric wave beams from another base station 2 (interfering base station) as shown in FIG. 1. In FIG. 1, reference symbol 2a denotes the cell of the interfering base station 2. In addition, in FIG. 1, a general shape of a beam 1b generated at the desired base station 1, and a general shape of the beam 2b generated at the interfering base station 2 are illustrated. A part of the beam 2b generated at the interfering base station 2, i.e., a part of a beam for downlink channels for other mobile communication terminals (for example, a mobile communication terminal 12) causes an interfering signal for the mobile communication terminal 10.

IRC is described in, for example, Patent Document 1, Non-patent Document 1, and Non-patent Document 2.

In an IRC reception technique, reception weights $W_{MMSE,\,i}$ for a mobile communication terminal that receives signals can be calculated with the use of Equation (1) below derived from an MMSE (minimum mean-square-error) algorithm.

$$W_{MMSE,i} = P_s(H_i W_{TX,i})^H \left( \sum_{i=1}^{N_{UE}} P_s(H_i W_{TX,i})(H_i W_{TX,i})^H + \sigma_i^2 I \right)^{-1} \quad (1)$$

Equation (1) can be utilized in a case in which information on all downlink channels that may cause large interference can be estimated. In Equation (1), suffix i in each parameter denotes the number of the mobile communication terminal. In Equation (1), $P_s$ is a scalar indicative of a transmission power per symbol from the desired base station for a mobile communication terminal #i. $H_i$ is a channel matrix (channel impulse matrix) of the mobile communication terminal #i. In this channel matrix, the number of rows is the number of receiving antennas of the mobile communication terminal #i, whereas the number of columns is the number of transmitting antennas of the desired base station for the mobile communication terminal #i. In summary, this channel matrix is a channel matrix of downlink channels to the mobile communication terminal #i from the desired base station for the mobile communication terminal #i. $W_{TX,\,i}$ is a precoding matrix generated at the desired base station for the mobile communication terminal #i and used for downlink transmission from the desired base station to the mobile communication terminal #i. This precoding matrix has rows of which the number is the number of transmitting antennas of the desired base station for the mobile communication terminal #i, and columns of which the number is the number of the transmission layers, i.e., the number of the transmission streams transmitted from the desired base station for the mobile communication terminal #i. If the number of transmitting antennas of the base station is one, this precoding matrix is a scalar. (With this respect, Equation (1) can be also used in SIMO (single-input multiple-output).)

$\sigma_i^2$ indicates a noise power at the mobile communication terminal #i, and $\sigma_i$ is a standard deviation of the noise power. I is an identity matrix.

$N_{UE}$ is the sum of the total number of mobile communication terminals that receive downlink channels that may significantly interfere with the downlink channel received by the mobile communication terminal for which the receiving weights are to be calculated, and 1 (the number of mobile communication terminal for which the receiving weights are to be calculated). "Downlink channels that may significantly interfere with the downlink channel received by the mobile communication terminal" mean downlink channels that use the same frequency as that for the desired downlink channel.

Superscript H on the right side in the Equation (1) denotes complex conjugate transpose.

According to Equation (1), each mobile communication terminal can calculate receiving weights $W_{MMSE,\,i}$ not only on the basis of the channel matrix of the downlink channel from the desired base station for the mobile communication terminal to the mobile communication terminal, and the precoding matrix generated at the desired base station for the mobile communication terminal, but also on the basis of channel matrices of downlink channels of signals coming into the mobile communication terminal transmitted from desired base stations for other mobile communication terminals in order to send the downlink signals to other mobile communication terminals, and precoding matrices generated at other base stations for other mobile communication terminals for downlink transmission to other mobile communication terminals. In SU-MIMO, desired base stations for other mobile terminals are different from the desired base station for the mobile communication terminal for which receiving weights are to be calculated.

The mobile communication terminal can estimate the product of the channel matrix of the downlink channel from the desired base station to mobile communication terminal and the precoding matrix thereof, on the basis of a reference signal, which will be described later. In order to use Equation (1), the mobile communication terminal should know or estimate channel matrices and precoding matrices with respect to signals transmitted to other mobile communication terminals, i.e., interfering signals. However, use of Equation (1) enhances the ability to suppress interference by beams from other base stations, because Equation (1) uses channel matrices and precoding matrices with respect to other mobile communication terminals for calculating the receiving weights.

In a case in which information on all downlink channels that may cause large interference cannot be estimated, it is possible to calculate reception weights $W_{MMSE,i}$ for a mobile communication terminal that receives signals by using Equation (2) below, as an alternative IRC reception technique.

$$W_{MMSE,i} = P_s(H_i W_{TX,i})^H (R_{yy,i}^{-1})^T \quad (2)$$

In Equation (2), superscript T indicates transposition. $R_{yy,i}$ is a covariance matrix of the received signal for the mobile communication terminal #i, and is calculated from Equation (3).

$$R_{yy,i} = \frac{1}{M} \sum_{m=1}^{M} y_i(m) * y_i(m^T) \quad (3)$$

In Equation (3), $y_i(m)$ is a vector of a signal received at the mobile communication terminal #i, in which m is the sample number of the received signal. Mobile communication terminal #i calculates the received signal vector ($y_i(m)$) for each of receiving antennas of the mobile communication terminal #i. The sample number m is a combination of the number of the received subcarrier and the symbol number of the OFDM (Orthogonal Frequency Division Multiplexing) symbol. In Equation (3), the asterisk denotes conjugate, whereas T denotes transpose. M is the total number of samples used for averaging, and is freely determined. Thus, each mobile terminal processes vectors of samples of signals at respective receiving antennas of the mobile communication terminal, and averages the matrices obtained by the process, thereby obtaining the covariance matrix $R_{yy,i}$.

According to Equation (2), each mobile communication terminal can calculate the receiving weights $W_{MMSE,i}$ from the channel matrix of downlink channels from the desired base station for the mobile communication terminal to the mobile communication terminal, the precoding matrix for the mobile communication terminal generated at the desired base station, and received signal vectors. It is possible to estimate the product of the channel matrix of downlink channels from the desired base station to the mobile communication terminal and the precoding matrix thereof on the basis of the reference signal, which will be described later. Therefore, if Equation (2) is used, it is unnecessary to estimate channel matrices of interfering waves coming from interfering base stations for downlink signal transmission to other mobile communication terminals. However, for enhancing the ability to suppress interference by beams from other base stations, it is necessary to prepare many samples m used for averaging in Equation (3).

Accordingly, if Equation (1) can be used, the method for calculating receiving weights with the use of Equation (1) is more preferable than the method with the use of Equation (2).

3GPP LTE-Advanced (Release 10) regulates the UE-specific reference signal as a reference signal for demodulation transmitted in the physical downlink shared channel (PDSCH), as described in Non-patent Document 3. Using the UE-specific reference signal, the mobile communication terminal can modulate signals where at most 8 layers (ranks) are multiplexed.

FIGS. 2 through 4 show mapping of the UE-specific reference signals on a resource block. In FIGS. 2 through 4, reference symbol RB designates a single resource block, and each square designates a resource element that is a minimum resource unit defined by a single subcarrier and a single OFDM symbol. Reference symbol RS designates the UE-specific reference signal. The ordinate denotes frequency (subcarrier), whereas the abscissa denotes time (OFDM symbol).

FIG. 2 shows mapping of the UE-specific reference signals in a case in which the number of layers is two. As shown in FIG. 2, the UE-specific reference signal RS of layer L1 uses three subcarriers, and uses two consecutive OFDM symbols periodically (intermittently). Similarly, the UE-specific reference signal RS of layer L2 uses three subcarriers that are also used for layer L1, and uses two consecutive OFDM symbols periodically (intermittently). The UE-specific reference signal RS of layer L1 is distinguished from that of layer L2 by means of different orthogonal codes of which the sequence length is two. That is to say, with the use of code divisional multiplexing (CDM) by using different orthogonal codes, the UE-specific reference signals RS for layers L1 and L2 are distinguished from each other. In other words, two layers L1 and L2 are orthogonally multiplexed. Thus, twelve resource elements per resource block RB are used for the UE-specific reference signals RS.

FIG. 3 shows mapping of the UE-specific reference signals in a case in which the number of layers is four. As shown in FIG. 3, the UE-specific reference signal RS of each layer (layer L1, L2, L3, or L4) uses three subcarriers, and uses two consecutive OFDM symbols periodically (intermittently). The UE-specific reference signals RS for layers L1 and L2 use the same subcarriers, but are distinguished by means of different orthogonal codes of which the sequence length is two. That is to say, with the use of code divisional multiplexing (CDM) by using different orthogonal codes, the UE-specific reference signals RS for layers L1 and L2 are distinguished from each other. The UE-specific reference signals RS of layers L3 and L4 are sent by subcarriers that are different from those for the UE-specific reference signals RS of layers L1 and L2. That is to say, layers L3 and L4 are distinguished from layers L1 and L2 by means of frequency division multiplexing (FDM). The UE-specific reference signals RS for layers L3 and L4 use the same subcarriers, but are distinguished by means of different orthogonal codes of which the sequence length is two. That is to say, with the use of code divisional multiplexing (CDM) by using different orthogonal codes, the UE-specific reference signals RS for layers L3 and L4 are distinguished from each other. Consequently, four layers L1, L2, L3, and L4 are orthogonally multiplexed. Thus, 24 resource elements per resource block RB are used for the UE-specific reference signals RS.

FIG. 4 shows mapping of the UE-specific reference signals in a case in which the number of layers is eight. As shown in FIG. 4, the UE-specific reference signal RS of each layer (each of layers L1 through L8) uses three subcarriers, and uses two consecutive OFDM symbols periodically (intermittently). The UE-specific reference signals RS for layers L1, L2, L5, and L7 use the same subcarriers, but are distinguished by means of different orthogonal codes of which the sequence length is four. That is to say, with the use of code divisional multiplexing (CDM) by using different orthogonal codes, the UE-specific reference signals RS for layers L1, L2, L5, and L7 are distinguished from one another. The UE-specific reference signals RS of layers L3, L4, L6, and L8 are sent by subcarriers that are different from those for the UE-specific reference signals RS of layers L1, L2, L5, and L7. That is to say, layers L3, L4, L6, and L8 are distinguished from layers L1, L2, L5, and L7 by means of frequency division multiplexing (FDM). The UE-specific reference signals RS for layers L3, L4, L6, and L8 use the same subcarriers, but layers L3 and L4 are distinguished by means of different orthogonal codes of which the sequence length is four. That is to say, with the use of code divisional multiplexing (CDM) by using different orthogonal codes, the UE-specific reference signals RS for layers L3, L4, L6, and L8 are distinguished from each other. Consequently, eight layers L1 through L8 are orthogonally multiplexed. Thus, 24 resource elements per resource block RB are used for the UE-specific reference signals RS.

The UE-specific reference signal can indicates the product $H_i W_{TX,i}$ of the channel matrix $H_i$ of downlink channels to the mobile communication terminal that receives the UE-specific reference signal for demodulating received signals and the precoding matrix $W_{TX,i}$ for the mobile communication terminal.

The mobile communication terminal transmits the channel matrix $H_i$ of the downlink channel calculated at the mobile communication terminal to the desired base station. The desired base station calculates the precoding matrix $W_{TX,i}$ for the mobile communication terminal from the channel matrix, and informs the mobile communication terminal of the product $H_i W_{TX,i}$ of the channel matrix and the precoding matrix by means of the UE-specific reference signal.

As described in Subclause 6.10.3.1 of Non-patent Document 3, the UE-specific reference signal is scrambled by a scramble sequence r(m) at each cell (i.e., each base station) in addition to the orthogonal code of which the sequence length is 2 or 4. The scramble sequence r(m) is allocated depending on the subcarrier number m of the subcarrier on which the UE-specific reference signal is sent. The scramble sequence r(m) is calculated in accordance with Equation (4) below.

$$r(m) = \frac{1}{\sqrt{2}}(1 - 2 \cdot c(2m)) + j\frac{1}{\sqrt{2}}(1 - 2 \cdot c(2m+1)) \quad (4)$$

In Equation (4), m is the subcarrier number, and in a case in which a normal cyclic prefix is used, m is a variable obtained by the following equation:

$$m = 0, 1, \ldots, 12 N_{RB}^{max,DL} - 1.$$

In a case in which an extended cyclic prefix is used, the subcarrier number m is a variable obtained by the following equation:

$$m = 0, 1, \ldots, 16 N_{RB}^{max,DL} - 1.$$

$N_{RB}^{max,DL}$ is the largest downlink bandwidth configuration, i.e., the total number of resource blocks available at the base station.

c(i) is a pseudo-random sequence, of which the initial value $c_{init}$ is calculated in accordance with Equation (5).

$$c_{init} = (\lfloor n_s/2 \rfloor + 1) \cdot (2 N_{ID}^{cell} + 1) \cdot 2^{16} + n_{SCID} \quad (5)$$

In Equation (5), $n_s$ is the slot number within the radio frame, $N_{ID}^{cell}$ is the physical layer cell identity, and $n_{SCID}$ is the identification number of the scramble sequence and is 0 or 1.

As described above, since the base station scrambles the UE-specific reference signals, the mobile communication terminal should recognize the UE-specific reference signals by descrambling received signals before executing channel estimation using the UE-specific reference signal. Accordingly, the base station informs the mobile communication terminal of the cell ID and the scramble sequence identification number $n_{SCID}$.

In radio communication systems complying with LTE Release 10, different cell IDs are allocated to individual cells, i.e., individual base stations. For example, in the structure of FIG. 5, cell IDs 1, 2, and 3 are allocated to base stations 1, 2, and 3 (thus, cells 1a, 2a, and 3a), respectively. In FIG. 5, the base station 1 is the desired base station for the mobile communication terminal 10. The mobile communication terminal 10 is located near the boundary of the cell 1a of the desired base station 1, especially, near cells 2a and 3a of interfering base stations 2 and 3, and may receive beams 2b and 3b from the interfering base stations 2 and 3. A part of the beam 2b that is the beam for a downlink channel to another mobile communication terminal (for example, the mobile communication terminal 12) causes interfering signal 2c for the mobile communication terminal 10, whereas a part of the beam 3b causes the interfering signal 3c for the mobile communication terminal 10.

The mobile communication terminal 10 shown in FIG. 5 is informed of the cell ID of the desired base station 1, the number of transmitting antennas of the desired base station 1, the number of transmission layers transmitted from the desired base station 1 to the mobile communication terminal 10, the UE-specific reference signal layer number corresponding to the number of transmission layers, and the scramble sequence identification number $n_{SCID}$ by control signals from the base station 1. The UE-specific reference signal layer number indicates which layer is used for transmitting the UE-specific reference signal that is used for demodulation of signals received by the mobile communication terminal 10 (see FIGS. 2 through 4). By knowing the UE-specific reference signal layer number, the mobile communication terminal 10 can be aware of the subcarriers (frequencies), the OFDM symbols, and the orthogonal codes used for transmission of the UE-specific reference signal. Furthermore, by knowing the cell ID and the scramble sequence identification number $n_{SCID}$, the mobile communication terminal 10 can calculate the scramble sequence r(m), and can recognize the UE-specific reference signal.

On the other hand, for radio communication systems complying with LTE Release 11, use of a single cell ID of particular multiple cells is under consideration. This is shown in FIG. 6. The radio communication system shown in FIG. 6 includes a remote radio head (RRH) 4 in addition to the structure shown in FIG. 5. The base stations 1, 2, and 3 shown in FIG. 6 are macro base stations each of which transmission power is great and the cell is broad (the cell is a macro cell). On the other hand, a remote radio head is a small base station connected to a macro base station via cable of which transmission rate is high, such as optical fibers, and has little transmission power so that its cell is narrow. The remote radio head is synchronized with the macro base station to which it is connected via cable, and the remote radio head itself communicates with mobile communication terminals. To the remote radio head, a cell ID that is the same as the cell ID allocated to the macro base station to which the remote radio head is connected via cable is allocated. In FIG. 6, the remote radio head 4 is connected to the macro base station 1 via cable, and synchronized with the macro base station 1. To the remote radio head 4, the cell ID allocated to the macro base station 1 is allocated. Remote radio heads are provided for performing inter-cell coordinated transmission (Coordinated Multi-Point transmission and reception, CoMP). Downlink CoMP is a scheme in which multiple base stations cooperate for signal transmission to a mobile communication terminal.

The mobile communication terminal 10 shown in FIG. 6 is located in the cell 4a of the remote radio head 4. In this case, the remote radio head 4 is the desired base station for the mobile communication terminal 10, and the mobile communication terminal 10 may receive the beam 1b from the interfering base stations 1. A part of the beam 1b that is the beam for a downlink channel to another mobile communication terminal (for example, the mobile communication terminal 12) causes interfering signal 1c for the mobile communication terminal 10.

The mobile communication terminal 10 shown in FIG. 6 is informed of the cell ID of the remote radio head 4 that is the desired base station, the number of transmitting antennas of the remote radio head 4 that is the desired base station, the number of transmission layers transmitted from the remote radio head 4 that is the desired base station to the mobile communication terminal 10, the UE-specific reference signal layer number corresponding to the number of transmission layers, and the scramble sequence identification number $n_{SCID}$ used in the mobile communication terminal 10 by control signals from the remote radio head 4 that is the desired base station.

For the mobile communication terminal 12 located in the cell 1a outside the cell 4a, the macro base station 1 is the desired base station. The mobile communication terminal 12 may receive the beam from the remote radio head 4 that is the interfering base station for the terminal 12, and a part of the beam may cause an interfering signal for the mobile communication terminal 12. The mobile communication terminal 12 is informed of the cell ID of the macro base station 1 that is the desired base station, the number of transmitting antennas of the desired base station 1, the number of transmission layers transmitted from the desired base station 1 to the mobile communication terminal 12, the UE-specific reference signal layer number corresponding to the number of transmission layers, and the scramble sequence identification number $n_{SCID}$ used in the mobile communication terminal 12 by control signals from the desired base station 1. The cell ID of the macro base station 1 is the same as that of the remote radio head 4.

PRIOR ART DOCUMENTS

Patent Documents

Patent Document 1: JP-A-2000-511370

Non-Patent Documents

Non-patent Document 1: R1-111031, 3GPP TSG RAN WG1 Meeting #64, Taipei, Taiwan, 21st-25 Feb. 2011, Agenda item: 6.3.1.3, Source: Nokia, Nokia Siemens Networks, Title: "On advanced UE MMSE receiver modelling in system simulations", Document for: Discussion and Decision Non-patent Document 2: Lars Thiele at al, "On the Value of Synchronous Downlink MIMO-OFDMA Systems with Linear Equalizers", Fraunhofer Institute for Telecommunications, Heinrich-Hertz-Institut Einsteinufer 37, 10587 Berlin, Germany Non-patent Document 3: 3GPP TS 36.211 V10.0.0 (2010-12), 3rd Generation Partnership Project; Technical Specification Group Radio Access Network; Evolved Universal Terrestrial Radio Access (E-UTRA); "Physical channels and modulation", (Release 10), December 2010

SUMMARY OF THE INVENTION

In the radio system shown in FIG. 5 (radio system in which different cell IDs are allocated to all base stations), the mobile communication terminal 10 is not informed of cell IDs of interfering base stations. Therefore, it is difficult to conduct the IRC reception method in which information on the downlink channels from interfering base stations is estimated and used (i.e., the method for calculating receiving weights with the use of Equation (1)). This is because the mobile communication terminal 10 is not aware of cell IDs of interfering base stations, and therefore the terminal 10 cannot estimate directly information on the channels from interfering base stations. In an alternation, without knowing cell IDs of interfering base stations, it is possible to estimate blind information on the channels from interfering base stations, but in this case, accuracy of the calculated receiving weights are low.

On the other hand, for the radio system shown in FIG. 6 (radio system in which a cell ID is allocated to some base stations that are synchronized with each other), the present inventors have found that there will be possibility that the mobile communication terminal can conduct accurate IRC reception.

The present invention provides a mobile communication terminal that can conduct accurate IRC reception in a radio system in which a cell ID is allocated to some base stations that are mutually synchronized.

According to the present invention, a mobile communication terminal adapted for communicating with a desired base station, includes: multiple receiving antennas for receiving electric wave; a desired UE-specific reference signal demodulator adapted for demodulating a desired UE-specific reference signal among from signals derived from electric wave received by the multiple receiving antennas, on the basis of a desired UE-specific reference signal layer number and a cell ID, the desired UE-specific reference signal being a UE-specific reference signal used for demodulating a desired reception signal at the mobile communication terminal, the desired UE-specific reference signal layer number indicating a layer on which the desired UE-specific reference signal is transmitted, the desired UE-specific reference signal layer number having been signaled from the desired base station, the cell ID indicating the desired base station, the cell ID having been signaled from the desired base station; a desired beam parameter estimator adapted for estimating desired beam parameters with respect to a desired beam of electric wave sent from the desired base station to the mobile communication terminal, using the desired UE-specific reference signal; an interfering UE-specific reference signal layer number recognizer adapted for recognizing interfering UE-specific reference signal layer numbers that are UE-specific reference signal layer numbers other than the desired UE-specific reference signal layer number; an interfering UE-specific reference signal demodulator adapted for demodulating interfering UE-specific reference signals used in other mobile communication terminals among from signals derived from electric wave received by the multiple receiving antennas, on the basis of the interfering UE-specific reference signal layer numbers recognized by the interfering UE-specific reference signal layer number recognizer and the cell ID; an interference rejection combining processor adapted for calculating receiving weights so as to suppress influence to the desired beam from other beams, on the basis of interference parameters and the desired beam parameters, the interference parameters being parameters with regard to other beams sent to other mobile communication terminals from an interfering base station that is a base station different from the desired base station, the interference parameters being specified by an interfering UE-specific reference signal demodulated by the interfering UE-specific reference signal demodulator; and a signal separator adapted for separating a signal destined for the mobile communication terminal from signals destined for other mobile communication terminals among signals derived from electric wave received at the multiple receiving antennas, using the receiving weights calculated by the interference rejection combining processor.

In the present invention, a single cell ID is allocated to some base stations that are mutually synchronized. The mobile communication terminal can demodulate the interfering UE-specific reference signals that are presumed to be likely to be used in other mobile communication terminals, on the basis of multiple interfering UE-specific reference signal layer numbers that are different from the desired UE-specific reference signal layer number and the cell ID. By analyzing the demodulated interfering UE-specific reference signals, the product of interference channel impulse parameters and interference precoding parameters are estimated. The interference channel impulse parameters indicate the channel impulse response of interfering beams sent from interfering base stations destined for other mobile communication terminals that affect the desired beam when the interfering beams come to the subject mobile communication terminal. The interference precoding parameters are produced by interfering base stations for sending beams to other mobile communication terminals. On the basis of desired beam parameters (the product of desired channel impulse parameters and the desired precoding parameters) and interference parameters (the product of the interference channel impulse parameters and the interference precoding parameters), the interference rejection combining processor calculates receiving weights so as to suppress influence to the desired beam from other beams. Therefore, the mobile communication terminal can conduct accurate IRC reception.

The interfering UE-specific reference signal layer number recognizer may recognize the interfering UE-specific reference signal layer numbers on the basis of a total number of mutually orthogonal transmission layers that are available by the desired base station and the interfering base station for transmitting UE-specific reference signals.

The interfering UE-specific reference signal layer number recognizer may recognize the interfering UE-specific reference signal layer numbers on the basis of a total number of distinguishable transmission layers that is defined by a total number of mutually orthogonal transmission layers that are available by the desired base station and the interfering base station for transmitting UE-specific reference signals and a number of scramble sequences for scrambling UE-specific reference signals.

The interfering UE-specific reference signal layer number recognizer may recognize the interfering UE-specific reference signal layer numbers on the basis of a number of transmitting antennas of the interfering base station, the number of the transmitting antennas being signaled from the desired base station.

The mobile communication terminal according to the present invention may further include: a desired beam power measurer adapted for measuring a reception electric power of the desired beam corresponding to the desired UE-specific reference signal indicated by the desired UE-specific reference signal layer number; an interfering beam power measurer adapted for measuring reception electric powers of multiple other beams corresponding to multiple interfering UE-specific reference signals indicated by multiple interfering UE-specific reference signal layer numbers; and a power ratio calculator adapted for calculating a ratio of the reception electric power of each of the other beams to the reception electric power of the desired beam, in which the interference rejection combining processor calculates the receiving weights with the use of the interference parameters for the other beams of which the ratio is greater than a threshold and without use of the interference parameters for the other beams of which the ratio is less than the threshold.

With such a structure, for calculating the receiving weights, it is possible to use interference parameters regarding only other beams on transmission layers significantly interfering with the desired beam. In other words, even if there are many interfering UE-specific reference signal layer numbers that might be used by other mobile stations, it is possible to exclude, from calculating the receiving weights, interference parameters regarding transmission layers that are not actually used. Accordingly, load for calculating the receiving weights can be reduced, and the receiving weights can be calculated accurately.

DESCRIPTION OF EMBODIMENTS

With reference to the accompanying drawings, various embodiments according to the present invention will be described.

Figure 1:
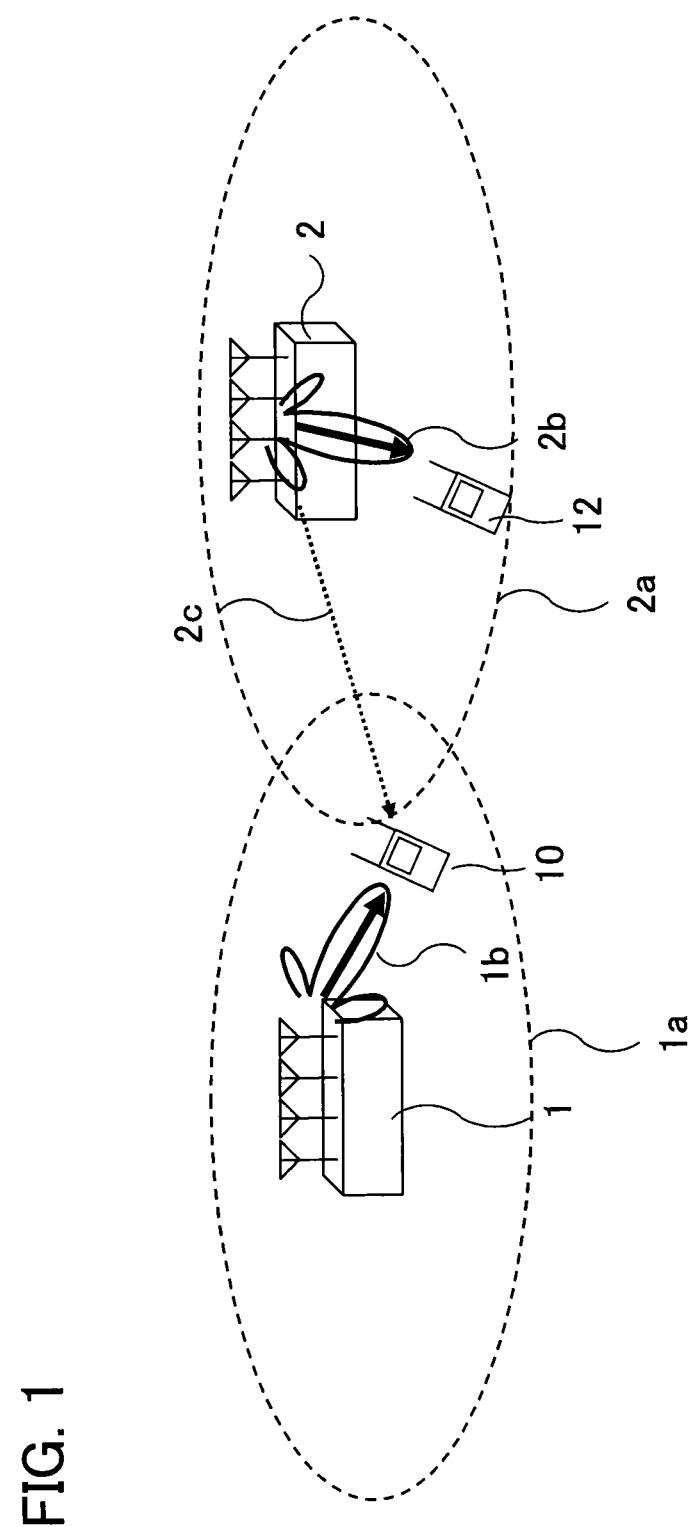
FIG. 1 is a view showing mobile communication terminal receiving an interfering beam from an interfering base station.
Figure 6:
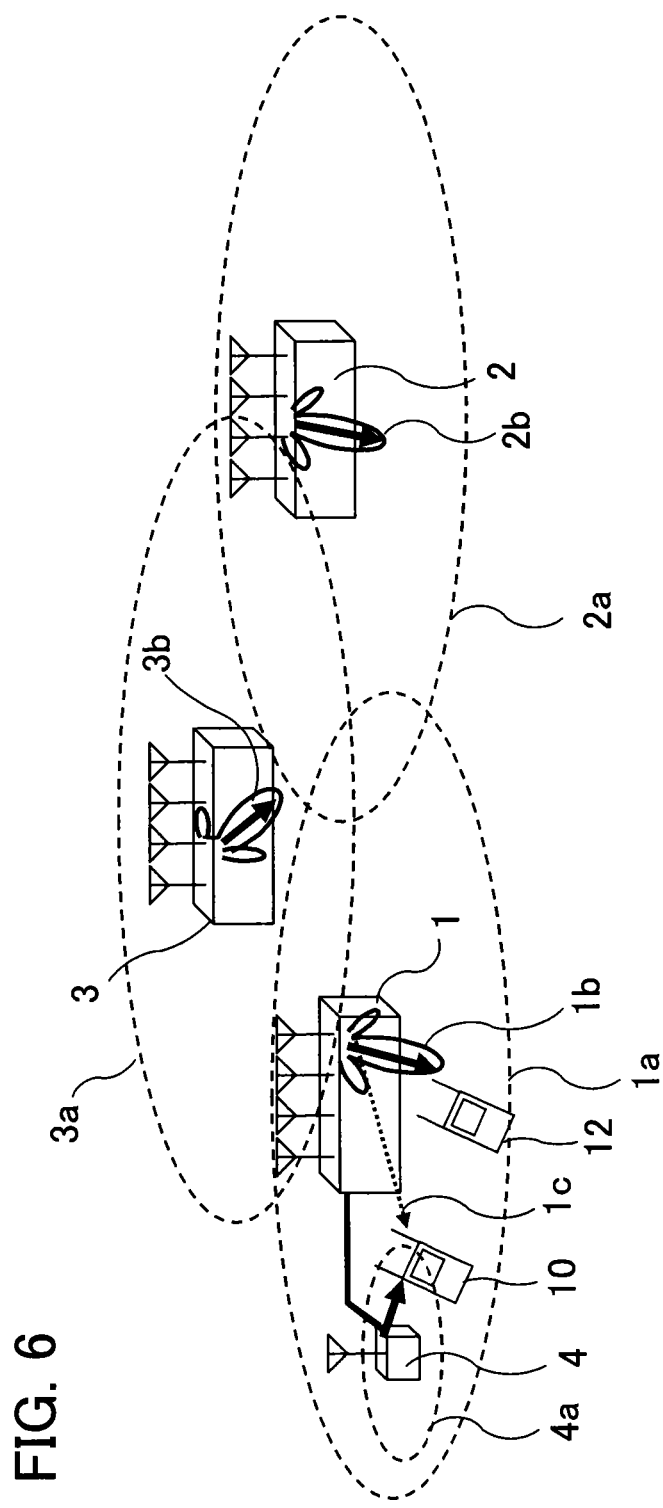
FIG. 6 is a view showing a radio communication system according to an embodiment of the present invention.

The mobile communication terminal according to the present invention is used in a radio communication system shown in FIG. 6. As described above, a single cell ID is allocated to the macro base station 1 and the remote radio head 4, and these base stations (the macro base station 1 and the remote radio head 4) are mutually synchronized. Different cell IDs are allocated to the macro base stations 1, 2, and 3, and these base stations are asynchronous. In FIG. 1, a remote radio head 4 is dependent on a macro base station, but multiple remote radio head 4 may be dependent on a macro base station.

Each of the mobile communication terminals 10 and 12 is, for example, a mobile phone (UE (user equipment) in LTE). For the mobile communication terminal 10 located in the cell 4a of the remote radio head 4, the remote radio head 4 is its desired base station, whereas the macro base station 1 is an interfering base station (other remote radio heads that are not shown may be interfering base stations). For the mobile communication terminal 12 located in cell 1a but outside the cell 4a, the macro base station 1 is its desired base station, whereas the remote radio head 4 is an interfering base station. Each of the mobile communication terminals 10 and 12 is adapted for both MIMO and SIMO.

By means of control signals from the remote radio head 4 that is the desired base station for the mobile communication terminal 10, the mobile communication terminal 10 is informed of the cell ID of the remote radio head 4 that is its desired base station, the number of transmitting antennas of the remote radio head 4 that is its desired base station, the number of transmission layers sent to the mobile communication terminal 10 from the remote radio head 4 that is its desired base station, the UE-specific reference signal layer numbers corresponding to the number of the transmission layers, and the scramble sequence identification number $n_{SCID}$. By means of control signals from the desired base station 1 for the mobile communication terminal 12, the mobile communication terminal 12 is informed of the cell ID of the macro base station 1 that is its desired base station (the cell ID is the same as that of the remote radio head 4), the number of transmitting antennas of the desired base station 1, the number of transmission layers sent to the mobile communication terminal 12 from the desired base station 1, the UE-specific reference signal layer numbers corresponding to the number of the transmission layers, and the scramble sequence identification number $n_{SCID}$.

First Embodiment

Figure 7:
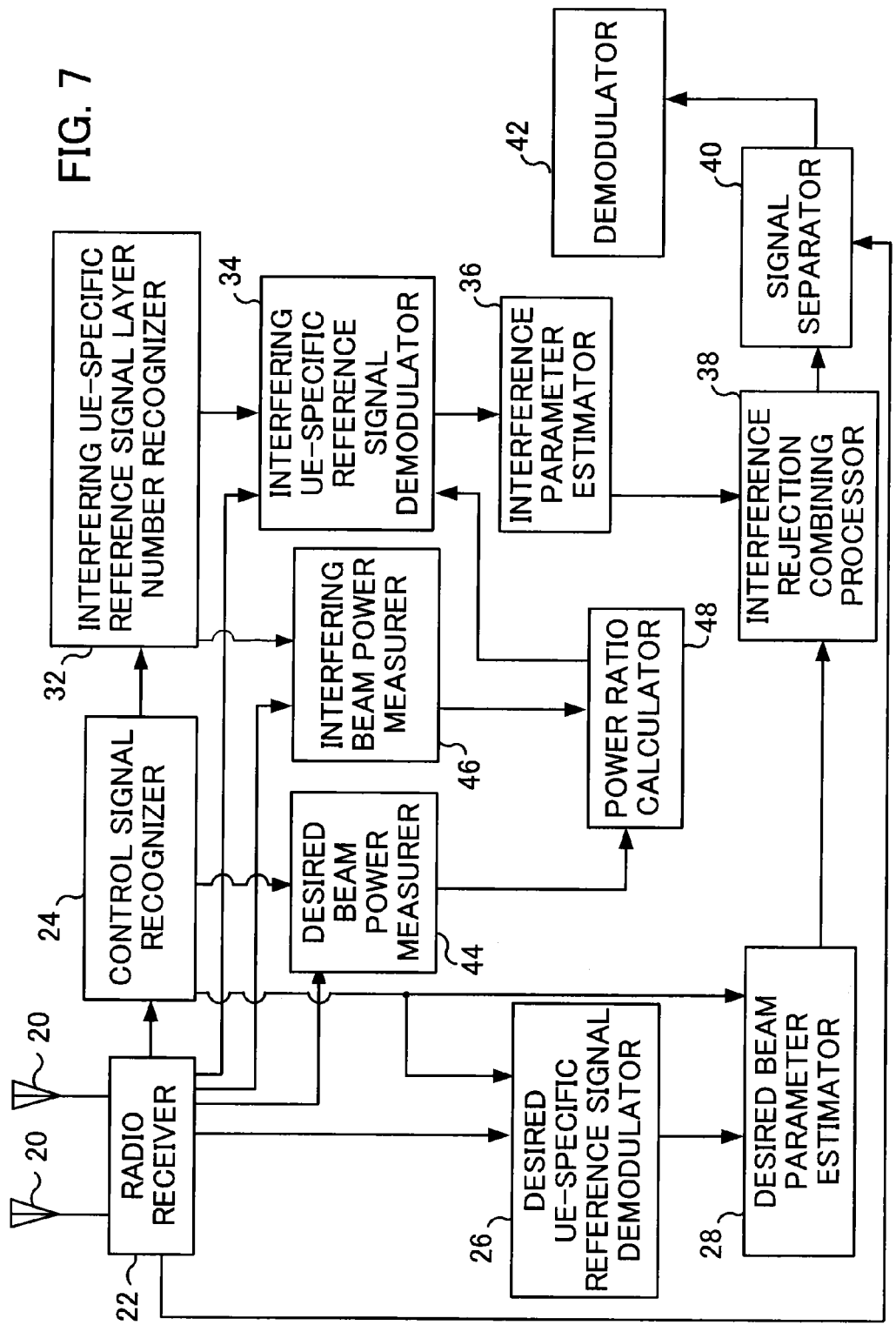
FIG. 7 is a block diagram showing the structure of the mobile communication terminal according to the embodiment of the present invention.

FIG. 7 is a block diagram showing the structure of the mobile communication terminal according to the embodiment of the present invention. FIG. 7 shows only parts involved in signal reception and does not show other parts. As shown in FIG. 7, each mobile communication terminal includes multiple receiving antennas 20 for receiving electric wave, and a radio receiver 22 that is a reception circuit for converting electric wave received at the receiving antennas 20 to an electric signal.

Furthermore, the mobile communication terminal includes a control signal recognizer 24, a desired UE-specific reference signal demodulator 26, a desired beam parameter estimator 28, an interfering UE-specific reference signal layer number recognizer 32, an interfering UE-specific reference signal demodulator 34, an interference parameter estimator 36, an interference rejection combining processor 38, a signal separator 40, a demodulator 42, and a power ratio calculator 48. These structural elements are functional blocks that are realized by that a CPU (not shown) in the mobile communication terminal executes a computer program and functions in accordance with the computer program. Furthermore, the mobile communication terminal includes a desired beam power measurer 44 and an interfering beam power measurer 46.

The control signal recognizer 24 recognizes control signals sent from the desired base station among signals output from the radio receiver 22. As described above, the control signals indicate the cell ID of the desired base station, the number of transmitting antennas of the desired base station, the number of transmission layers sent to the mobile communication terminal from the desired base station, the UE-specific reference signal layer numbers representing the layers on which the UE-specific reference signals to be processed by the mobile communication terminal are transmitted, and the scramble sequence identification number $n_{SCID}$. In the following, the UE-specific reference signal to be processed by the mobile communication terminal, i.e., the UE-specific reference signal used by the mobile communication terminal for demodulating a desired reception signal will be referred to as a desired UE-specific reference signal. In addition, the layer number representing the layer on which the desired UE-specific reference signal is transmitted will be referred to as a desired UE-specific reference signal layer number.

Figure 2:
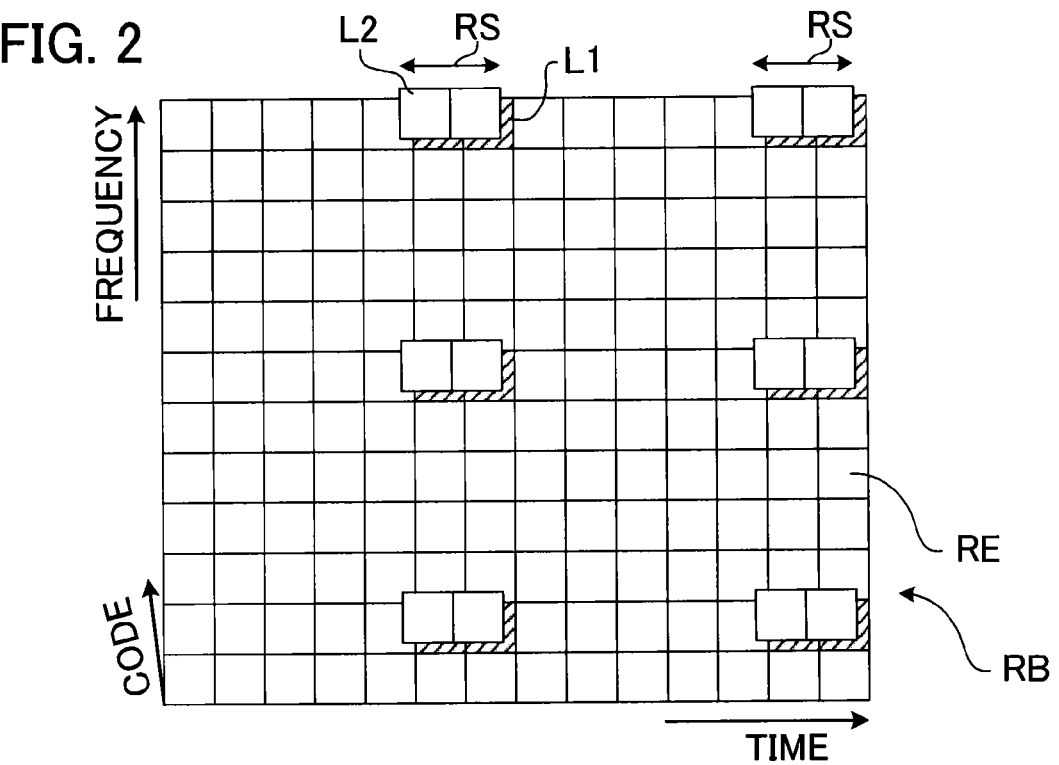
FIG. 2 is a view showing mapping of UE-specific reference signals on a resource block.
Figure 3:
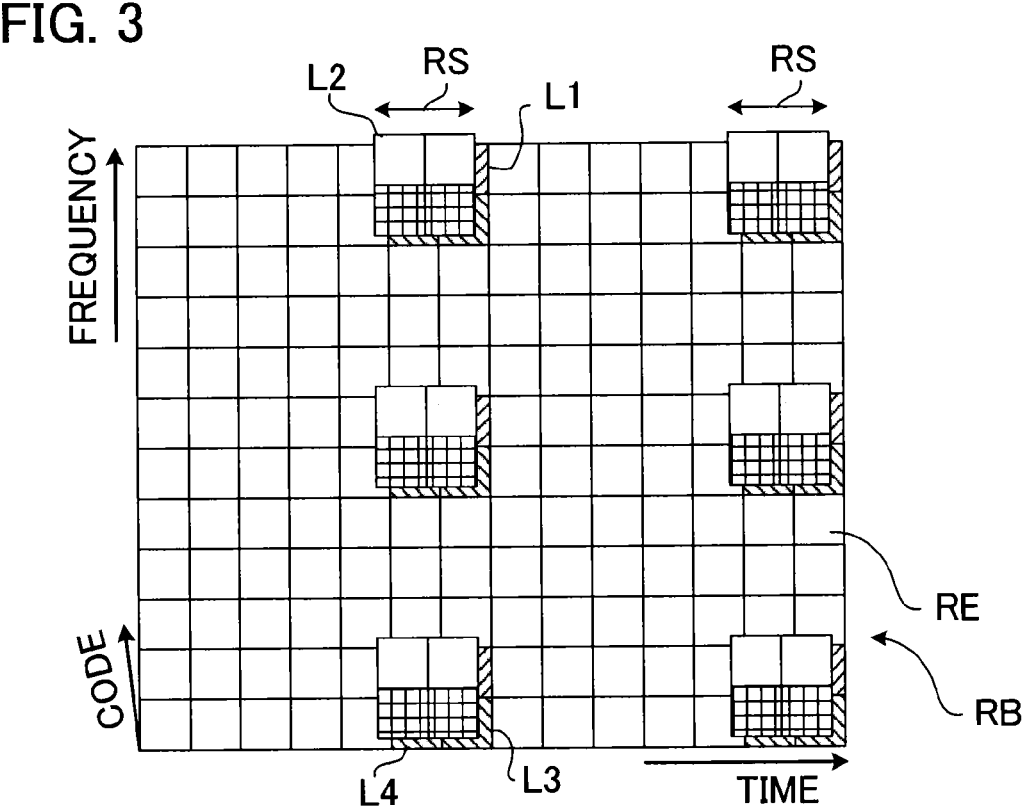
FIG. 3 is a view showing mapping of UE-specific reference signals on a resource block.
Figure 4:
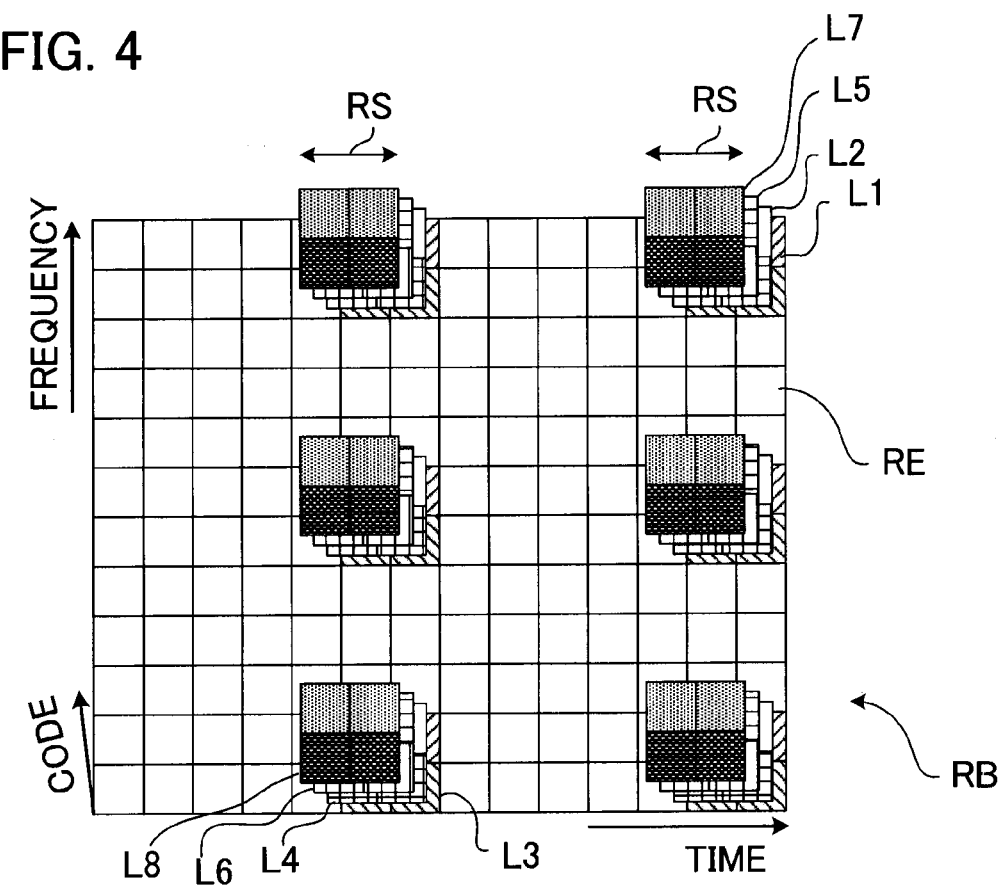
FIG. 4 is a view showing mapping of UE-specific reference signals on a resource block.
Figure 5:
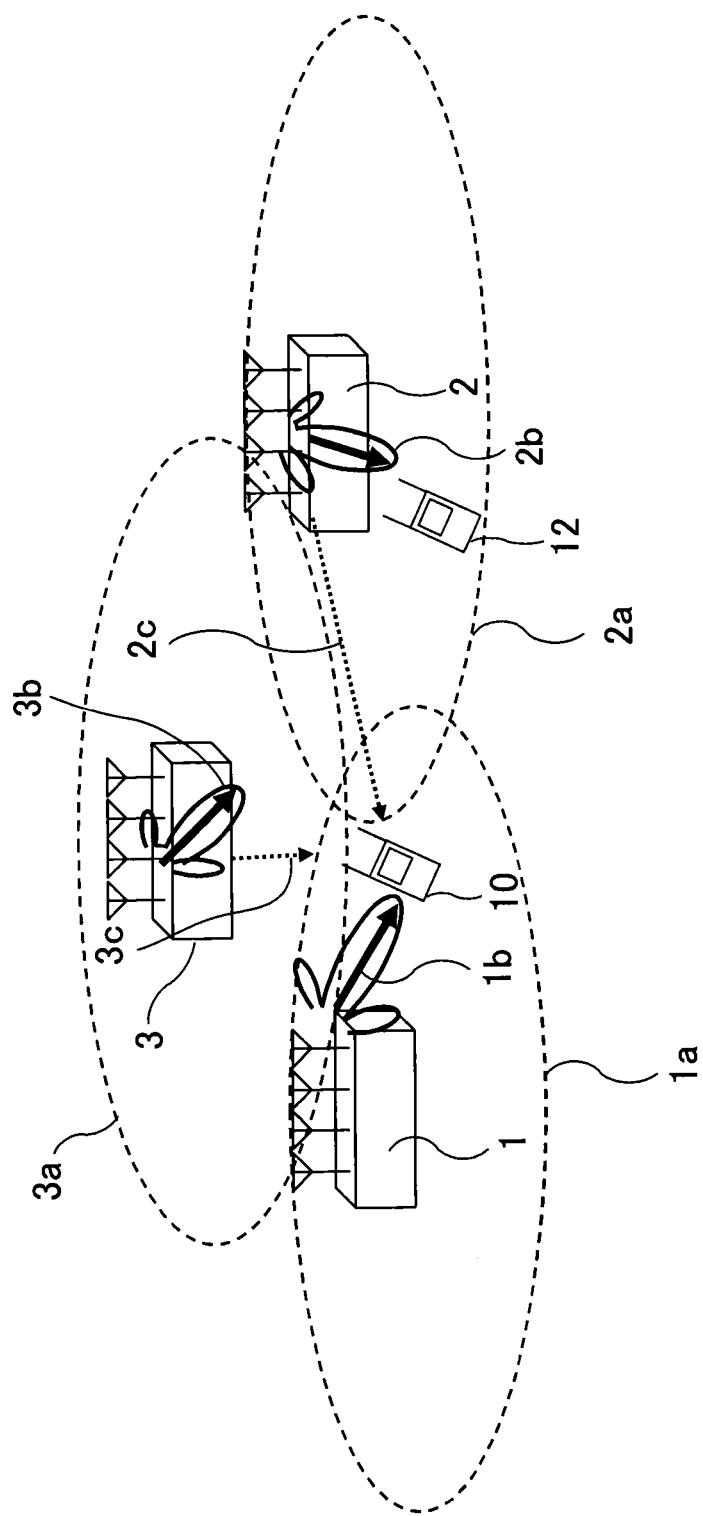
FIG. 5 is a view showing a mobile communication terminal receiving interfering beams from interfering base stations.

The desired UE-specific reference signal demodulator 26 demodulates the desired UE-specific reference signal from signals output from the radio receiver 22 on the basis of the desired UE-specific reference signal layer number signaled by the desired base station and recognized by the control signal recognizer 24, the cell ID of the desired base station signaled by the desired base station, and the scramble sequence identification number $n_{SCID}$ signaled by the desired base station. More specifically, the desired UE-specific reference signal demodulator 26 calculates the initial value $c_{init}$ of the pseudo-random sequence c(i) from the cell ID $N_{ID}^{cell}$ of the desired base station, the scramble sequence identification number $n_{SCID}$, and the slot number $n_s$ within the radio frame, in accordance with above-mentioned Equation (5). From the initial value $c_{init}$, the desired UE-specific reference signal demodulator 26 calculates the pseudo-random sequence c(i) used in the scramble sequence r(m) for scrambling the desired UE-specific reference signal. Furthermore, from the desired UE-specific reference signal layer number, the desired UE-specific reference signal demodulator 26 obtains the subcarrier number m of the subcarrier on which the desired UE-specific reference signal is sent. In accordance with above-mentioned Equation (4), the desired UE-specific reference signal demodulator 26 descrambles the desired UE-specific reference signal on the layer indicated by the desired UE-specific reference signal layer number with the scramble sequence r(m). The above-mentioned mapping patterns shown in FIGS. 2 through 4 are known to the mobile communication terminal, and therefore, if it knows the desired UE-specific reference signal layer number, the mobile communication terminal can specifies the desired UE-specific reference signal. Thus, the desired UE-specific reference signal is descrambled (demodulated).

If multiple desired UE-specific reference signal layer numbers are signaled from the desired base station and are recognized by the control signal recognizer 24, the desired UE-specific reference signal demodulator 26 descrambles multiple desired UE-specific reference signals specified by these multiple numbers.

The desired beam parameter estimator 28 recognizes the product $H_i W_{TX, i}$ of a desired channel impulse matrix (desired channel matrix) $H_i$ and a desired precoding matrix $W_{TX, i}$. The desired channel impulse matrix is the channel impulse matrix of the desired downlink beam from the desired base station to the mobile communication terminal and specified in the desired UE-specific reference signal demodulated by the desired UE-specific reference signal demodulator 26. The desired precoding matrix is a precoding matrix generated by the desired base station in order to transmit the desired beam to the mobile communication terminal. If the desired UE-specific reference signal demodulator 26 descrambles multiple desired UE-specific reference signals, the desired beam parameter estimator 28 estimates the product of the desired channel matrix regarding multiple desired UE-specific reference signals and the desired precoding matrix.

The desired base station can inform the mobile terminal of the product of the desired channel matrix and the desired precoding matrix by means of the UE-specific reference signal. The mobile communication terminal calculates the channel matrix with the use of a reference signal (cell-specific reference signal or channel state information reference signal) different from the UE-specific reference signal, and feeds it back to the desired base station for the mobile communication terminal. On the basis of the desired channel matrix fed back from the mobile communication terminal, the desired base station calculates the desired precoding matrix, and signals the product of the desired channel matrix and the desired precoding matrix to the mobile terminal. Alternatively, the mobile communication terminal may calculate the desired precoding matrix on the basis of the channel matrix calculated by the mobile communication terminal itself, and may feed the desired precoding matrix back to the desired base station. Alternatively, on the basis of the channel matrix calculated by the mobile communication terminal itself, the mobile communication terminal may select one or multiple matrices from among the precoding matrices (codebooks) commonly held in mobile communication terminals and base stations, and may feed the indexes of matrices back to the desired base station. Alternatively, in a system in which base stations calculates precoding matrices without use of information on channel matrix, and so on, the mobile communication terminal does not need feed the channel matrix, the precoding matrix, index information, etc. back.

The interfering UE-specific reference signal layer number recognizer 32 recognizes interfering UE-specific reference signal layer numbers that are UE-specific reference signal layer numbers other than the desired UE-specific reference signal layer number recognized by the control signal recognizer 24. For example, in Release 10 and Release 11 of LTE, the upper limit of the number of layers that can be orthogonally multiplied to transmit UE-specific reference signals (total number of available orthogonally multiplied layers) is 8 (see FIG. 4). That is to say, in systems complying with Release 10 or Release 11 of LTE, the total number of mutually orthogonal transmission layers available by the desired base station and interfering base stations for sending UE-specific reference signals (the upper limit of the number of available orthogonally multiplied layers) is 8. On the basis of the total number, the interfering UE-specific reference signal layer number recognizer 32 can recognize interfering UE-specific reference signal layer numbers. More specifically, the interfering UE-specific reference signal layer number recognizer 32 recognizes that interfering UE-specific reference signal layer numbers are all layer numbers for UE-specific reference signals other than the layer number for the desired UE-specific reference signal recognized by the control signal recognizer 24 among the orthogonally multiplied layers available in the system complying with Release 10 or Release 11 of LTE. For example, if the mobile communication terminal has a single desired UE-specific reference signal layer, the interfering UE-specific reference signal layer number recognizer 32 recognizes the other seven UE-specific reference signal layer numbers as the interfering UE-specific reference signal layer numbers. If the mobile communication terminal has two desired UE-specific reference signal layers, the interfering UE-specific reference signal layer number recognizer 32 recognizes the other six UE-specific reference signal layer numbers as the interfering UE-specific reference signal layer numbers. The macro base station 1 and the remote radio heads depending on the macro base station 1 mutually signal the layer number of the UE-specific reference signals used for mobile communication terminals in the cell of the base station itself, and use different UE-specific reference signals for all mobile communication terminals in the cells of the macro base station 1 and all remote radio heads depending on the macro base station 1.

On the basis of the interfering UE-specific reference signal layer numbers recognized by the interfering UE-specific reference signal layer number recognizer 32, and the cell ID of the desired base station signaled from the desired base station, the interfering UE-specific reference signal demodulator 34 demodulates interfering UE-specific reference signals that are presumed to be likely to be used in other mobile communication terminals from the signals output from the radio receiver 22. More specifically, from the cell ID of the desired base station and the slot number $n_s$ within the radio frame, in accordance with above-mentioned Equation (5), the interfering UE-specific reference signal demodulator 34 calculates the initial value $c_{init}$ of the pseudo-random sequence c(i). From the initial value $c_{init}$, the interfering UE-specific reference signal demodulator 34 calculates the pseudo-random sequence c(i) used for the scramble sequence r(m) for scrambling interfering UE-specific reference signals.

As will be apparent from Equation (5), in order to obtain the initial value $c_{init}$ of the pseudo-random sequence c(i) used in the scramble sequence r(m) for scrambling interfering UE-specific reference signals, the interfering UE-specific reference signal demodulator 34 shall know the cell IDs $N_{ID}^{cell}$ of interfering base stations, the scramble sequence identification number $n_{SCID}$, and the slot number $n_s$ within the radio frame.

As described above, a single cell ID is allocated commonly to the macro base station 1 and the remote radio head 4. If the desired base station for the mobile communication terminal is the macro base station 1, the cell ID of the desired base station is also the cell ID of the interfering base station (remote radio head 4). If the desired base station for the mobile communication terminal is the remote radio head 4, the cell ID of the desired base station is also the cell of the interfering base station (macro base station 1). Therefore, the interfering UE-specific reference signal demodulator 34 can use the cell ID of the desired base station signaled from the desired base station as the cell IDs of interfering base stations in Equation (5), and can obtain the initial value $c_{init}$ for interfering UE-specific reference signals.

In Release 10 of LTE, the scramble sequence identification number $n_{SCID}$ is 0 or 1. More specifically, if the layer on which the UE-specific reference signal is transmitted is layer L1 or L2, $n_{SCID}$ is 0 or 1. If the layer on which the UE-specific reference signal is transmitted is any one of layers L3 to L8, $n_{SCID}$ is 0. The interfering UE-specific reference signal demodulator 34 uses, in Equation (5), all reasonable values for $n_{SCID}$ possibly used for scrambling interfering UE-specific reference signals recognized by the interfering UE-specific reference signal layer number recognizer 32, so as to obtain the initial value $c_{init}$ for interfering UE-specific reference signals. As a result, multiple initial values $c_{init}$ can be obtained.

As described above, since the macro base station 1 and the remote radio head 4 are mutually synchronized, the slot number $n_s$ within the radio frame is common to the desired base station and the interfering base station. The interfering UE-specific reference signal demodulator 34 uses the slot number $n_s$ used in the mobile communication terminal in Equation (5) to obtain the initial value $c_{init}$ for the interfering UE-specific reference signal.

Furthermore, the interfering UE-specific reference signal demodulator 34 obtains, from interfering UE-specific reference signal layer number, the subcarrier number m of the subcarrier on which the interfering UE-specific reference signal are sent. Then, in accordance with above-mentioned Equation (4), the interfering UE-specific reference signal demodulator 34 descrambles the interfering UE-specific reference signal on the layer indicated by the interfering UE-specific reference signal layer number with the use of the scramble sequence r(m). Because the above-described mapping patterns shown in FIGS. 2 through 4 are already known to the mobile communication terminal, if the mobile communication terminal recognizes the interfering UE-specific reference signal layer numbers, the mobile communication terminal can specify the interfering UE-specific reference signals. Thus, the interfering UE-specific reference signals are descrambled (demodulated).

The interference parameter estimator 36 analyzes interference channel impulse parameters and interference precoding parameters. The interference channel impulse parameters are specified by the interfering UE-specific reference signal demodulated by the interfering UE-specific reference signal demodulator 34, and indicate the channel impulse response of beams sent from interfering base stations destined for other mobile communication terminals. The interference precoding parameters are produced by interfering base stations for sending beams to other mobile communication terminals. In this embodiment, the interference channel impulse parameters are represented as a channel matrix, i.e., interference channel matrix, whereas the interference precoding parameters are represented as a precoding matrix, i.e., interference precoding matrix. As described above, the desired base station sends the product of the channel matrix and the precoding matrix to the mobile communication terminal by using the UE-specific reference signal. Similarly, interfering base stations send the product of the channel matrix and the precoding matrix to mobile communication terminals in cells of the interfering base stations by using the UE-specific reference signals. Therefore, an interfering UE-specific reference signal indicates the product of an interference channel matrix and an interference precoding matrix, whereby the interference parameter estimator 36 estimates the product of the interference channel matrix and the interference precoding matrix by analyzing the interfering UE-specific reference signal.

On the basis of the product of the desired channel matrix and the desired precoding matrix obtained by the desired beam parameter estimator 28 and on the basis of the product of the interference channel matrix and the interference precoding matrix obtained by the interference parameter estimator 36, the interference rejection combining processor 38 calculates the receiving weights $W_{MMSE,\,i}$ so as to suppress influence to the desired beam from other beams. More specifically, the interference rejection combining processor 38 uses Equation (1) for calculating receiving weights. The transmission power $P_s$ of the desired base station, the transmission power $P_s$ of the interfering base station, and the noise power $\sigma_i^2$ that are used in Equation (1) are estimated by a known technique.

Using the receiving weights calculated by the interference rejection combining processor 38, the signal separator 40 separates a signal destined for the mobile communication terminal from signals destined for other mobile communication terminals among signals output from the radio receiver 22. The demodulator 42 demodulates and decodes the signal destined for the mobile communication terminal separated by the signal separator 40 to obtain a data signal.

The desired beam power measurer 44, the interfering beam power measurer 46, and the power ratio calculator 48 serve for restricting the number of candidates of the interfering UE-specific reference signals that are presumed to be likely to be used in other mobile communication terminals. If the above-mentioned upper limit of the number of available orthogonally multiplied layers is 8, the number of the interfering UE-specific reference signal layer numbers recognized by the above-mentioned interfering UE-specific reference signal layer number recognizer 32 is equal to or less than 7. However, in fact, there are not many mobile communication terminals located in cells of neighboring base stations and using the same frequency (subchannel) simultaneously. The UE-specific reference signal actually used for a mobile communication terminal shall give a large interference to another mobile communication terminal that uses the same frequency. Accordingly, this embodiment uses the desired beam power measurer 44, the interfering beam power measurer 46, and the power ratio calculator 48, for causing the interfering UE-specific reference signal demodulator 34 to demodulate only the interfering UE-specific reference signals of which the interfering powers are large. As a result, the interference rejection combining processor 38 uses the interference channel matrix and the interference precoding matrix with respect to interfering UE-specific reference signals of which interfering powers are large for calculating the receiving weights.

Using the desired UE-specific reference signal specified by the desired UE-specific reference signal layer number recognized by the control signal recognizer 24, the desired beam power measurer 44 measures the reception electric power of the desired beam corresponding to the desired UE-specific reference signal. If multiple desired UE-specific reference signal layer numbers are signaled from the desired base station and the control signal recognizer 24 recognizes the multiple desired UE-specific reference signal layer numbers, the desired beam power measurer 44 may measure the reception electric power regarding only one desired UE-specific reference signal specified by any one of the desired UE-specific reference signal layer numbers, and may output the reception electric power. Alternatively, the desired beam power measurer 44 may measure the multiple reception electric powers regarding multiple desired UE-specific reference signals specified by the multiple desired UE-specific reference signal layer numbers, and may designate one multiple reception electric power in accordance with a criterion for outputting. For example, the desired beam power measurer 44 may select the maximum reception electric power or the minimum reception electric power, or may calculate the average of multiple reception electric powers.

Using the multiple interfering UE-specific reference signals specified by multiple interfering UE-specific reference signal layer numbers recognized by the interfering UE-specific reference signal layer number recognizer 32, the interfering beam power measurer 46 measures the reception electric power of each of multiple other beams (interfering beams) corresponding to multiple interfering UE-specific reference signals. Thus, the interfering beam power measurer 46 measures multiple reception electric powers.

For each of the multiple interfering beams, the power ratio calculator 48 calculates the ratio of the reception electric power of the interfering beam to the reception electric power of the desired beam output from the desired beam power measurer 44. The calculation results of the power ratio calculator 48 are supplied to the interfering UE-specific reference signal demodulator 34.

The interfering UE-specific reference signal demodulator 34 demodulates the interfering UE-specific reference signals corresponding to interfering beams of which the power ratio calculated by the power ratio calculator 48 is greater than a threshold (for example, 3 dB), but does not demodulate other interfering UE-specific reference signals corresponding to interfering beams of which the power ratio is less than the threshold. Accordingly, the processing load of the interfering UE-specific reference signal demodulator 34 can be reduced. In addition, such selection of the interfering UE-specific reference signals results in that the interference rejection combining processor 38 uses the product of the interference channel matrix and the interference precoding matrix for the interfering beams of which the power ratio calculated by the power ratio calculator 48 is greater than the threshold, but does not use the product of the interference channel matrix and the interference precoding matrix for other interfering beams of which the power ratio calculated by the power ratio calculator 48 is less than the threshold for calculating the receiving weights. In other words, even if there are many interfering UE-specific reference signal layer numbers that might be used by other mobile stations, it is possible to exclude, from calculating the receiving weights, interference channel impulse parameters and interference precoding parameters regarding transmission layers that are not actually used. Accordingly, load for calculating the receiving weights can be reduced, and the receiving weights can be calculated accurately.

Second Embodiment

In a second embodiment, the calculation results of the power ratio calculator 48 may be supplied to the interference rejection combining processor 38, and the interference rejection combining processor 38 may select the product of the interference channel matrix and the interference precoding matrix for only the interfering beams of which the power ratio calculated by the power ratio calculator 48 is greater than the threshold and may use the product for calculating the receiving weights. In this alternative embodiment, even if there are many interfering UE-specific reference signal layer numbers that might be used by other mobile stations, it is possible to exclude, from calculating the receiving weights, interference channel impulse parameters and interference precoding parameters regarding transmission layers that are not actually used. Accordingly, load for calculating the receiving weights can be reduced, and the receiving weights can be calculated accurately.

Third Embodiment

In the above-described first embodiment, the interfering UE-specific reference signal layer number recognizer 32 recognizes the interfering UE-specific reference signal layer numbers on the basis of the upper limit of the number of available orthogonally multiplied layers (total number of available orthogonally multiplied layers) in a system complying with Release 10 or Release 11 of LTE. That is to say, the interfering UE-specific reference signal layer number recognizer 32 recognizes, as interfering UE-specific reference signal layer numbers, all layer numbers for UE-specific reference signals other than the layer number for the desired UE-specific reference signal recognized by the control signal recognizer 24 among the orthogonally multiplied layers available by the desired base station and the interfering base stations.

In a third embodiment, the interfering UE-specific reference signal layer number recognizer 32 may recognize interfering UE-specific reference signal layer numbers on the basis of the upper limit of the number of available quasi-orthogonally multiplied layers (total number of available quasi-orthogonally multiplied layers) in a system complying with Release 10 or Release 11 of LTE. The total number of quasi-orthogonally multiplied layers is the total number of distinguishable transmission layers defined by the total number of orthogonally multiplied layers and the number of scramble sequences for scrambling UE-specific reference signals. In Release 10 or Release 11 of LTE, the upper limit of the number of orthogonally multiplied layers (the total number of available orthogonally multiplied layers) is 8 (see FIG. 4). The above-mentioned scramble sequence identification number $n_{SCID}$ is 0 or 1. More specifically, if the layer on which the UE-specific reference signal is transmitted is layer L1 or L2, $n_{SCID}$ is either of two options, 0 or 1. If the layer on which the UE-specific reference signal is transmitted is any one of layers L3 to L8, $n_{SCID}$ is 0 (i.e., only one option). Accordingly, in systems complying with Release 10 or Release 11 of LTE, the total number of quasi-orthogonal transmission layers available for sending UE-specific reference signals (the sum of the total number of mutually orthogonal transmission layers available for transmitting UE-specific reference signals and the number of transmission layers distinguished by scramble sequences for scrambling UE-specific reference signals) is 10. On the basis of the total number, the interfering UE-specific reference signal layer number recognizer 32 can recognize the interfering UE-specific reference signal layer numbers. More specifically, the interfering UE-specific reference signal layer number recognizer 32 recognizes, as interfering UE-specific reference signal layer numbers, all layer numbers for UE-specific reference signals other than the layer number for the desired UE-specific reference signal recognized by the control signal recognizer 24 among the quasi-orthogonally multiplied layers available for transmitting UE-specific reference signals. For this purpose, the interfering UE-specific reference signal layer number recognizer 32 is provided with not only the desired UE-specific reference signal specified by the desired UE-specific reference signal layer number recognized by the control signal recognizer 24, but also the identification number $n_{SCID}$ recognized by the control signal recognizer 24.

For example, if the mobile communication terminal uses only the UE-specific reference signal on layer L1 and 0 as $n_{SCID}$, another mobile communication terminal in the cell of the interfering base station using the UE-specific reference signal on layer L1 never uses 0 as $n_{SCID}$ (it should use 1 as $n_{SCID}$ in this case). Accordingly, if the control signal recognizer 24 recognizes that the mobile communication terminal uses only the combination on layer L1 and $n_{SCID}$ 0, the interfering UE-specific reference signal layer number recognizer 32 recognizes that interfering UE-specific reference signal layer numbers are the combination of layer L1 and $n_{SCID}$ 1, and layers L2 through L8. If the mobile communication terminal uses only the UE-specific reference signal on layer L2 and $n_{SCID}$ 1, another mobile communication terminal in the cell of the interfering base station using the UE-specific reference signal on layer L2 never uses 1 as $n_{SCID}$ (it should use 0 as $n_{SCID}$ 1, in this case). Accordingly, if the control signal recognizer 24 recognizes that the mobile communication terminal uses only the combination of layer L2 and $n_{SCID}$ 1, the interfering UE-specific reference signal layer number recognizer 32 recognizes that interfering UE-specific reference signal layer numbers are layer 1, the combination of layer L2 and $n_{SCID}$ 0, and layers L3 through L8. If the control signal recognizer 24 recognizes that the mobile communication terminal uses only the UE-specific reference signal on layer L3, the interfering UE-specific reference signal layer number recognizer 32 recognizes that interfering UE-specific reference signal layer numbers are layer 1, layer 2, and layers L4 through L8.

In other words, in the third embodiment, it can be considered that the interfering UE-specific reference signal layer number recognizer 32 not only recognizes interfering UE-specific reference signal layer numbers, but also specifies the scramble sequence identification number $n_{SCID}$ of the scramble sequence for scrambling an interfering UE-specific reference signal on the basis of another scramble sequence identification number $n_{SCID}$ of the scramble sequence for scrambling the desired UE-specific reference signal. In the third embodiment, features other than the interfering UE-specific reference signal layer number recognizer 32 may be the same as those in the first embodiment or the second embodiment.

Fourth Embodiment

In a fourth embodiment, the interfering UE-specific reference signal layer number recognizer 32 may recognize interfering UE-specific reference signal layer numbers on the basis of the number of transmitting antennas of the interfering base station, the number of the transmitting antennas being signaled from the desired base station. For this purpose, the desired base station informs the mobile communication terminal of the number of transmitting antennas of the interfering base station. The manner of signaling may be, for example, a control signal that is the same as the control signal for signaling the number of transmitting antennas of the desired base station, the number of transmission layers sent to the mobile communication terminal from the desired base station, the UE-specific reference signal layer number, and the scramble sequence identification number $n_{SCID}$, and in this case, the control signal recognizer 24 of the mobile communication terminal may recognize the number of transmitting antennas of the interfering base station from the control signal. Alternatively, the number may be signaled by another control signal, and the mobile communication terminal may recognize the number of transmitting antennas of the interfering base station using a recognizer that is different from the control signal recognizer 24.

The total number of transmission layers available by the desired base station and the interfering base station does not exceed the sum total of the number of transmitting antennas of the macro base station 1 and that of the remote radio head 4. In addition, the total number of transmission layers for UE-specific reference signals available by the interfering base station does not exceed the number of transmitting antennas of the interfering base station. For example, if the sum total of the number of transmitting antennas of the macro base station 1 and that of the remote radio head 4 is 3, the total number of transmission layers available by the desired base station and the interfering base station is at most 3. In this case, if the desired base station is transmitting the UE-specific reference signal on a single transmission layer to the mobile communication terminal, the number of transmission layers for the interfering UE-specific reference signals is at most 2. For example, if the sum total of the number of transmitting antennas of the macro base station 1 and that of the remote radio head 4 is 6, the total number of transmission layers available by the desired base station and the interfering base station is at most 6. In this case, if the desired base station is transmitting the UE-specific reference signals on two transmission layers to the mobile communication terminal, the number of transmission layers for the interfering UE-specific reference signals is at most 4.

By using the above-mentioned principle, the interfering UE-specific reference signal layer number recognizer 32 recognizes interfering UE-specific reference signal layer numbers that are UE-specific reference signal layer numbers other than the desired UE-specific reference signal layer number, on the basis of the number of transmitting antennas of the interfering base station signaled from the desired base station, the number of transmitting antennas of the desired base station signaled from the desired base station, and the desired UE-specific reference signal layer number recognized by the control signal recognizer 24. For example, if the sum total of the number of transmitting antennas of the macro base station 1 and that of the remote radio head 4 is 3, and if the desired UE-specific reference signal layer number used by the mobile communication terminal is only L3, the interfering UE-specific reference signal layer number recognizer 32 recognizes that interfering UE-specific reference signal layer numbers are L1 and L2. For example, if the sum total of the number of transmitting antennas of the macro base station 1 and that of the remote radio head 4 is 6, and if the desired UE-specific reference signal layer numbers used by the mobile communication terminal are L3 and L4, the interfering UE-specific reference signal layer number recognizer 32 recognizes that interfering UE-specific reference signal layer numbers are L1, L2, L5, and L6.

Furthermore, the interfering UE-specific reference signal layer number recognizer 32 may specify the scramble sequence identification number $n_{SCID}$ of the scramble sequence for scrambling an interfering UE-specific reference signal on the basis of another scramble sequence identification number $n_{SCID}$ of the scramble sequence for scrambling the desired UE-specific reference signal. As described above, if the layer on which the UE-specific reference signal is transmitted is layer L1 or L2, $n_{SCID}$ is either of two options, 0 or 1. If the layer on which the UE-specific reference signal is transmitted is any one of layers L3 to L8, $n_{SCID}$ is 0 (i.e., only one option). For example, if the sum total of the number of transmitting antennas of the macro base station 1 and that of the remote radio head 4 is 3, if the desired UE-specific reference signal layer number used by the mobile communication terminal is only L1, and if the mobile communication terminal uses 0 as $n_{SCID}$, the interfering UE-specific reference signal layer number recognizer 32 may recognize that interfering UE-specific reference signal layer numbers are the combination of layer L1 and $n_{SCID}$ 1, and layers L2 and L3 are interfering UE-specific reference signal layer numbers.

In accordance with the fourth embodiment, it is possible to restrict the number of candidates of the interfering UE-specific reference signals that are likely to be used in other mobile stations, and it is possible to exclude, from demodulation at the interfering UE-specific reference signal demodulator 34, UE-specific reference signals that are never used in the combination of the macro base station 1 and the remote radio head 4. Therefore, load for demodulating UE-specific reference signals can be reduced. In the fourth embodiment, features other than the interfering UE-specific reference signal layer number recognizer 32 may be the same as those in the first embodiment or the second embodiment.

Other Variations

In the mobile communication terminal, functions executed by the CPU may be executed by hardware or a programmable logic device, such as an FPGA (Field Programmable Gate Array) or a DSP (Digital Signal Processor), instead of the CPU.

In the above-described embodiments, channel impulse parameters and precoding parameters are represented as matrices. However, at least one type of these parameters may be represented in another fashion, and the receiving weights may be calculated by a mathematical scheme other than calculation of matrices.

In the above-described embodiments, the base stations that have the same cell ID and are mutually synchronized are a macro base station and remote radio heads depending on it. However, if multiple macro base stations have the same cell ID and are mutually synchronized, the present invention can be used in cells of these macro base stations.

The above-described embodiments and variations may be combined unless inconsistency arises.

REFERENCE SYMBOLS 1, 2, 3: Macro Base Station
4: Remote Radio Head
10: Mobile Communication Terminal
12: Mobile Communication Terminal
20: Receiving Antennas
22: Radio Receiver
24: Control Signal Recognizer
26: Desired UE-Specific Reference Signal Demodulator
28: Desired Beam Parameter Estimator
32: Interfering UE-Specific Reference Signal Layer Number Recognizer 34: Interfering UE-Specific Reference Signal Demodulator
36: Interference Parameter Estimator
38: Interference Rejection Combining Processor
40: Signal Separator
42: Demodulator
48: Power Ratio Calculator
44: Desired Beam Power Measurer
46: Interfering Beam Power Measurer

The invention claimed is:

1. A mobile communication terminal adapted for communicating with a desired base station, comprising:
multiple receiving antennas for receiving an electric wave;
a desired UE-specific reference signal demodulator adapted for demodulating a desired UE-specific reference signal among from signals derived from the electric wave received by the multiple receiving antennas, on the basis of a desired UE-specific reference signal layer number and a cell ID, the desired UE-specific reference signal being a UE-specific reference signal used for demodulating a desired reception signal at the mobile communication terminal, the desired UE-specific reference signal layer number indicating a layer on which the desired UE-specific reference signal is transmitted, the desired UE-specific reference signal layer number having been signaled from the desired base station, the cell ID indicating the desired base station, the cell ID having been signaled from the desired base station;
a desired beam parameter estimator adapted for estimating desired beam parameters with respect to a desired beam of the electric wave sent from the desired base station to the mobile communication terminal, using the desired UE-specific reference signal;
an interfering UE-specific reference signal layer number recognizer adapted for recognizing interfering UE-specific reference signal layer numbers that are UE-specific reference signal layer numbers other than the desired UE-specific reference signal layer number;
an interfering UE-specific reference signal demodulator adapted for demodulating interfering UE-specific reference signals used in other mobile communication terminals among from the signals derived from the electric wave received by the multiple receiving antennas, on the basis of the interfering UE-specific reference signal layer numbers recognized by the interfering UE-specific reference signal layer number recognizer and the cell ID;
an interference rejection combining processor adapted for calculating receiving weights so as to suppress influence to the desired beam from other beams, on the basis of interference parameters and the desired beam parameters, the interference parameters being parameters with regard to the other beams sent to the other mobile communication terminals from an interfering base station that is a base station different from the desired base station, the interference parameters being specified by an interfering UE-specific reference signal demodulated by the interfering UE-specific reference signal demodulator; and
a signal separator adapted for separating a signal destined for the mobile communication terminal from signals destined for the other mobile communication terminals among the signals derived from the electric wave received at the multiple receiving antennas, using the receiving weights calculated by the interference rejection combining processor.

2. The mobile communication terminal according to claim 1, wherein the interfering UE-specific reference signal layer number recognizer is adapted for recognizing the interfering UE-specific reference signal layer numbers on the basis of a total number of mutually orthogonal transmission layers that are available to the desired base station and the interfering base station for transmitting UE-specific reference signals.

3. The mobile communication terminal according to claim 1, wherein the interfering UE-specific reference signal layer number recognizer is adapted for recognizing the interfering UE-specific reference signal layer numbers on the basis of a total number of distinguishable transmission layers that is defined by a total number of mutually orthogonal transmission layers that are available to the desired base station and the interfering base station for transmitting UE-specific reference signals and a number of scramble sequences for scrambling UE-specific reference signals.

4. The mobile communication terminal according to claim 1, wherein the interfering UE-specific reference signal layer number recognizer is adapted for recognizing the interfering UE-specific reference signal layer numbers on the basis of a number of transmitting antennas of the interfering base station, the number of the transmitting antennas being signaled from the desired base station.

5. The mobile communication terminal according to claim 1, further comprising:
a desired beam power measurer adapted for measuring a reception electric power of the desired beam corresponding to the desired UE-specific reference signal indicated by the desired UE-specific reference signal layer number;
an interfering beam power measurer adapted for measuring reception electric powers of the other beams corresponding to the interfering UE-specific reference signals indicated by the interfering UE-specific reference signal layer numbers; and
a power ratio calculator adapted for calculating a ratio of the reception electric power of each of the other beams to the reception electric power of the desired beam,
wherein the interference rejection combining processor calculates the receiving weights with the use of the interference parameters for the other beams of which the ratio is greater than a threshold and without use of the interference parameters for the other beams of which the ratio is less than the threshold.

6. A mobile communication terminal adapted for communicating with a desired base station, comprising:
multiple receiving antennas for receiving an electric wave; and
circuitry configured to
demodulate a desired UE-specific reference signal among from signals derived from the electric wave received by the multiple receiving antennas, on the basis of a desired UE-specific reference signal layer number and a cell ID, the desired UE-specific reference signal being a UE-specific reference signal used for demodulating a desired reception signal at the mobile communication terminal, the desired UE-specific reference signal layer number indicating a layer on which the desired UE-specific reference signal is transmitted, the desired UE-specific reference signal layer number having been signaled from the desired base station, the cell ID indicating the desired base station, the cell ID having been signaled from the desired base station;
estimate desired beam parameters with respect to a desired beam of the electric wave sent from the desired base station to the mobile communication terminal, using the desired UE-specific reference signal;

recognize interfering UE-specific reference signal layer numbers that are UE-specific reference signal layer numbers other than the desired UE-specific reference signal layer number;

demodulate interfering UE-specific reference signals used in other mobile communication terminals among from the signals derived from the electric wave received by the multiple receiving antennas, on the basis of the interfering UE-specific reference signal layer numbers and the cell ID;

calculate receiving weights so as to suppress influence to the desired beam from other beams, on the basis of interference parameters and the desired beam parameters, the interference parameters being parameters with regard to the other beams sent to the other mobile communication terminals from an interfering base station that is a base station different from the desired base station, the interference parameters being specified by an interfering UE-specific reference signal; and separate a signal destined for the mobile communication terminal from signals destined for the other mobile communication terminals among the signals derived from the electric wave received at the multiple receiving antennas, using the receiving weights.

7. The mobile communication terminal according to claim 6, wherein the circuitry is configured to recognize the interfering UE-specific reference signal layer numbers on the basis of a total number of mutually orthogonal transmission layers that are available to the desired base station and the interfering base station for transmitting UE-specific reference signals.

8. The mobile communication terminal according to claim 6, wherein the circuitry is configured to recognize the interfering UE-specific reference signal layer numbers on the basis of a total number of distinguishable transmission layers that is defined by a total number of mutually orthogonal transmission layers that are available to the desired base station and the interfering base station for transmitting UE-specific reference signals and a number of scramble sequences for scrambling UE-specific reference signals.

9. The mobile communication terminal according to claim 6, wherein the circuitry is configured to recognize the interfering UE-specific reference signal layer numbers on the basis of a number of transmitting antennas of the interfering base station, the number of the transmitting antennas being signaled from the desired base station.

10. The mobile communication terminal according to claim 6, wherein the circuitry is configured to
    measure a reception electric power of the desired beam corresponding to the desired UE-specific reference signal indicated by the desired UE-specific reference signal layer number;
    measure reception electric powers of the other beams corresponding to the interfering UE-specific reference signals indicated by the interfering UE-specific reference signal layer numbers;
    calculate a ratio of the reception electric power of each of the other beams to the reception electric power of the desired beam; and
    calculate the receiving weights with the use of the interference parameters for the other beams of which the ratio is greater than a threshold and without use of the interference parameters for the other beams of which the ratio is less than the threshold.

* * * * *